INVENTOR
Harris Walker

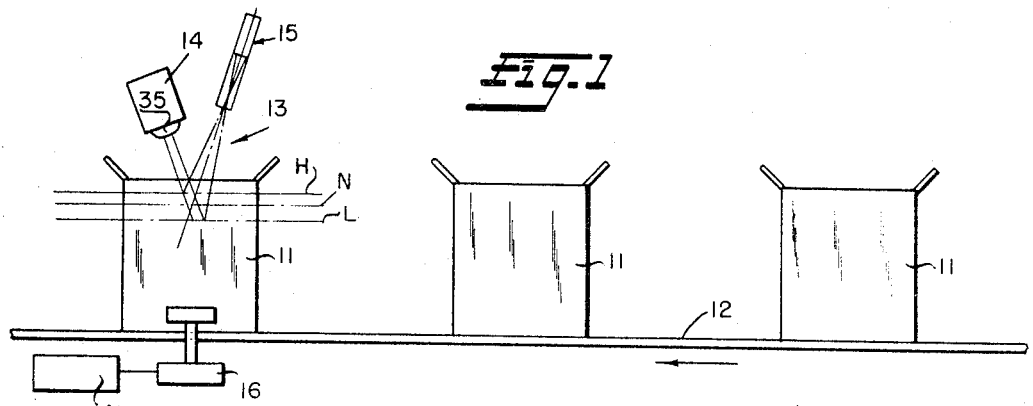
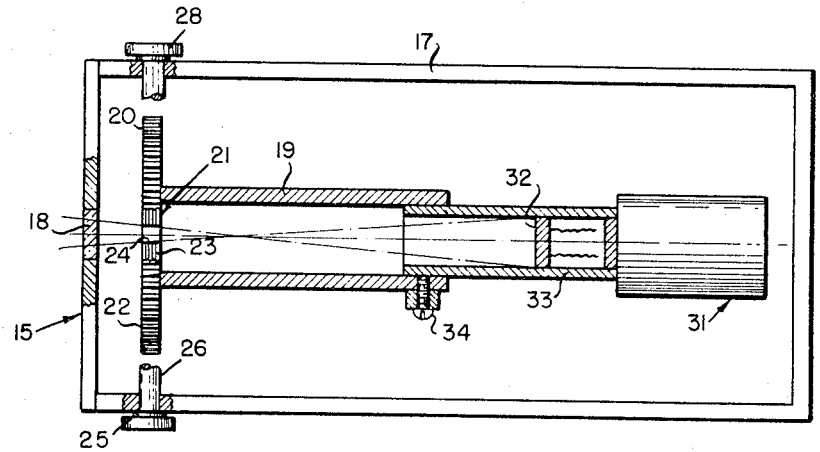
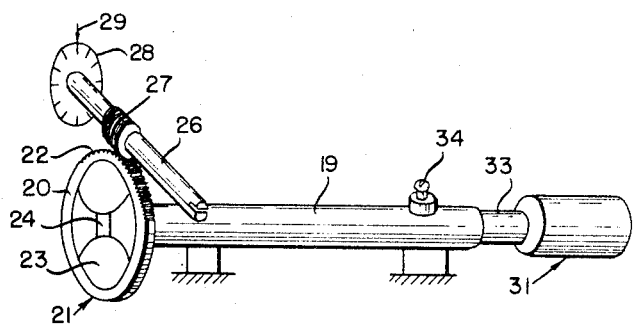
Fig. 3
INVENTOR
Harris Walker

United States Patent Office 3,404,282
Patented Oct. 1, 1968

3,404,282
APPARATUS FOR CHECKING SUBSTANCE LEVEL IN CONTAINERS WITHIN VARIABLE LIMITS
Harris Walker, Baldwin, N.Y., assignor to Colgate-Palmolive Company, New York, N.Y., a corporation of Delaware
Continuation of abandoned application Ser. No. 99,780, Mar. 31, 1961. This application Oct. 5, 1964, Ser. No. 401,443
6 Claims. (Cl. 250—222)

ABSTRACT OF THE DISCLOSURE

Apparatus for checking the level of a substance in a filled moving container within an acceptable deviation range comprises a light source angularly projecting a parallel light beam onto the top of the substance in the container and a photocell unit for receiving light reflected from that surface, there being a calibrated adjustable iris diaphragm on the unit for selectively varying the field of view of the photocell as the sole adjustment necessary to adapt the apparatus to different deviation ranges.

---

The present invention relates to light sensitive inspection apparatus, as for checking the levels of substance in moving containers, and particularly to improvements for adapting the apparatus readily to suit different substance levels and other changes in condition. This is a continuation of my co-pending application Ser. No. 99,780 filed Mar. 31, 1961, now abandoned.

It has been proposed, as in Hughes Patent 2,635,747 and Hughes et al. Patent No. 2,529,081, to employ a photoelectric container substance level inspection system, wherein the filled containers with the tops still open are moved through an inspection station wherein a light beam projected onto the top surface of the substance in the container is reflected toward a photocell unit. If the level is not within certain high and low limits, the amount of light reaching the photocell unit will be below a certain value, and the photocell acts to energize a device that rejects, or allows rejection of an improperly filled container. If the container is properly filled, the rejecting device is inactive.

Ordinarily, once these systems shown in the foregoing patents are installed and adjusted by a skilled worker, they perform very well. However, should the system be called upon to inspect containers having different acceptable limits of substance level or differently colored substances, positional adjustment of either the light unit or the photocell unit is needed. This requires the services of a skilled mechanic who by trial and error usually changes the location of the lamp and/or photocell units, and rearranges the associated apparatus, until an operative system is again in action. This is time consuming and expensive.

The present invention dispenses with such skilled trial and error adjustment, and replaces it with a simple accurate adjustment which varies the light incident on the photocell, and this variation adapts the system to a different set of measuring and inspection conditions. The arrangement is independent of ambient light conditions, and the adjustments are readily reproducible.

With the foregoing in mind it is the major object of the present invention to provide a novel light sensitive inspection apparatus, as for checking the levels of substance in filled containers, wherein the apparatus may be adapted precisely to different inspection conditions merely by controllably varying the aperture of light admission to the light sensitive cell to any desired opening, within set limits.

Further objects will appear as the description proceeds in connection with the appended claims and the annexed drawings wherein:

FIGURE 1 is a schematic view showing a photosensitive inspection system of the type in which the invention is used;

FIGURE 2 is a top plan view of the unit containing the photocell;

FIGURE 3 is a generally perspective view of elements within the unit of FIGURE 2;

Figure 4:
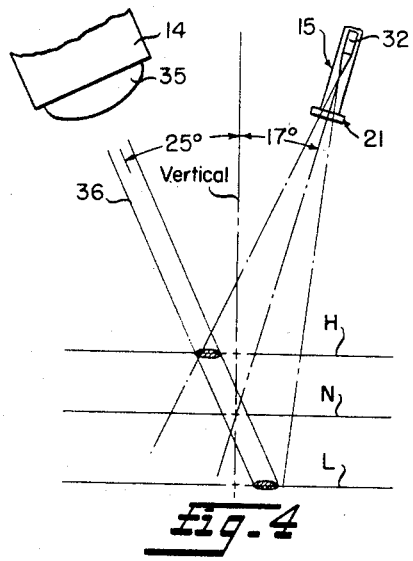
FIGURES 4 and 5 show the invention as applied to different permissible fill levels.

In accordance with the present invention there is provided an apparatus for checking the level of a substance in a filled container comprising means for projecting light onto the substance surface, a photosensitive assembly unit receiving light reflected from said surface and containing a photosensitive element, means for rejecting said container, an electric circuit connecting said photosensitive element to said rejecting means and adapted to control operation of rejecting means when the amount of reffected light received from said surface is other than within selected limits and means for effective limited infinitely variable adjustable changes in the amount of reflected light reaching said element, whereby the apparatus is suited for the inspection of filled containers within a pre-set range of different levels of fill, without the necessity of changing the relative positions of said light projecting means and said photosensitive unit with respect to the position of the filled container.

As illustrated diagrammatically in FIGURE 1, a row of contaiers 11 filled with a reflective substance, such as soap or detergent powder, on a moving conveyor 12 passes through an inspection station 13 where, at least for an adequate measuring period, light from a source of light 14 is projected onto the substance surface and reflected into a light sensitive cell unit 15 connected by a suitable circuit to a container reject device 16. If any container substance level is improper, the device 16 removes that container from the conveyor.

The overall arrangement may be similar to that of Hughes 2,635,747 whereby the photocell circuit is energized only when a container is within the station in position to properly receive and reflect the light beam, and the photosensitive arrangement of Hughes or other means for activating the inspection circuit of the light sensitive unit may be used in the invention to control activation of the circuit of unit 15. Of course, in suitable apparatuses the cell can be activated substantially continuously or may be continuously receptive to light rays.

Referring to FIGURES 2 and 3 the unit 15 comprises essentially a light tight mount for the light sensitive element, here a housing 17, having a front wall opening containing a glass or other transparent plate or film 18 or as may sometimes be acceptable, an equivalent opening in housing 17, with no transparent material covering it. Within the housing 17 is a hollow tube 19 axially aligned with glass 18 and fixed to the housing. An iris diaphragm assembly 21 is mounted within the housing with its opening coaxial with transparent plate 18. This assembly 21 may be carried by the front end of tube 19 adjacent plate 18, or it may be mounted on a separate support within the housing. It may even sometimes be desirable to locate it exteriorly. The iris assembly may be of the type normally used in cameras. As shown in FIGURE 3, a rotatable ring 20 driven by an external gear 22 is pivotally connected to a multiplicity of thin metal leaves 23, so that rotation of gear 22 in one direction or the other opens or closes the effective aperture 24 which is coaxial with the plate or opening at 18.

Gear 22 is rotated from a knob 25, located external to the housing, through a rotatable shaft 26 carrying a worm 27 meshed with gear 22. On the opposite side, where it projects from the housing, shaft 26 carries a graduated dial 28 coacting with a suitable index 29 on the housing wall. Thus the opening of aperture 24 can be accurately set or changed by turning shaft 26 while noting dial 28. If desired, the dial may be located on the knob side of the shaft.

A light sensitive cell assembly 31, which here comprises a cadmium sulfide cell 32 fixed in a tube 33, is mounted on the other end of tube 19 with a telescoped fit, and a set screw 34 may fix tubes 19 and 33 together in a suitable position of relative adjustment. In assembly, the tube 19 being fixed, the tube 33, also coaxial with plate or opening 18 and the reflected light path therethrough, is adjusted longitudinally until an acceptable area of cell 32 is illuminated. As is evident from this description, a change in area of aperture 24 will correspondingly change the amount of light incident upon cell 32.

FIGURE 4 shows the relative arrangement of parts at the inspection station, and in FIGURES 1 and 4 the allowable substance level limits are indicated between H which is an overfill and L which is an underfill. Any substance level below L or above H will result in reject of the container. The level N is merely indicated as an optimum normal of acceptable fill.

As shown in FIGURE 4 the light source contains a condenser lens 35 adapted to project a parallel light beam 36 at an angle of about 25° to the vertical. As illustrated in FIGURE 4, by projecting a parallel light beam onto the surface of the substance, substantially the same surface area of the substance will be illuminated thereby regardless of whether the level is at the high or low limits of deviation from the optimum fill level indicated at N, and therefore the same amount of light will be reflected toward the light sensitive cell unit within the acceptable deviation range. The optical axis of unit 15 is inclined at about 17° to the vertical and disposed to receive reflected light from the surface of the substance within the level limits between H and L. These relative arrangements have been found best for inspecting boxes of several sizes filled to usual packing height with detergent. The vertical inclinations indicated are those of the axes of beam 36 and unit 15, which intersect at the normal acceptable level of substance in the container.

Figure 6:
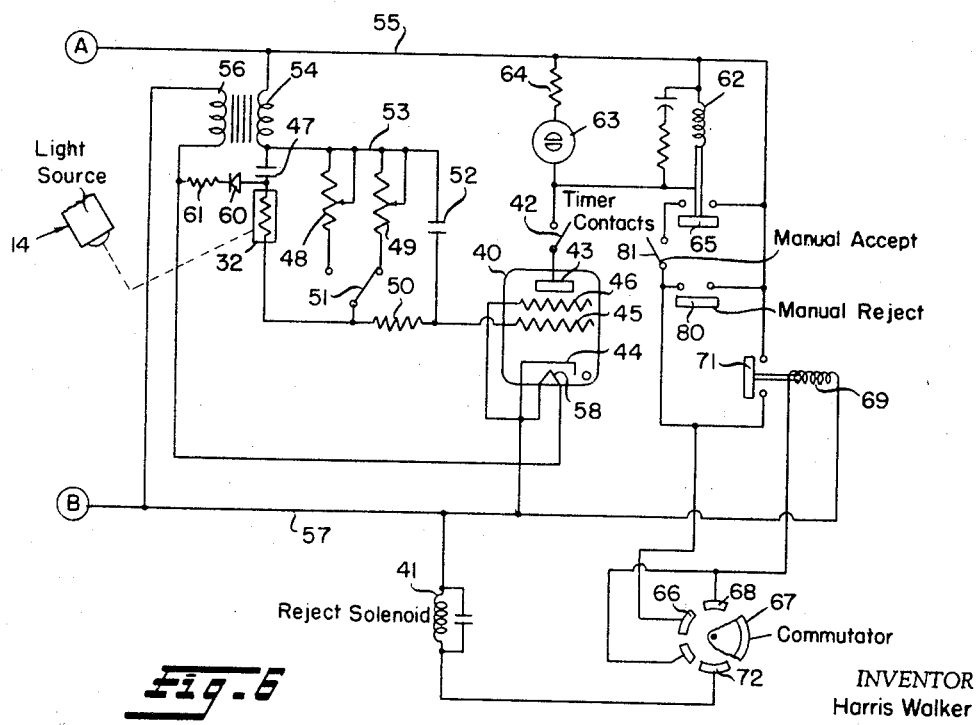
FIGURE 6 is a circuit diagram of a system using the invention.

FIGURE 6 shows a circuit for photoelectrically detecting the fill level of each container at the station 13. Basically the circuit comprises a thyratron tube 40 which is normally nonconducting so that reject solenoid 41 of device 16 is not energized. Whenever the level of the contents in a container is detected to be above or below the desired position, thyratron tube 40 fires to thereby subsequently energize reject solenoid 41 at a time such that the improperly filled container will be rejected, as by removal from conveyor 13.

When timer contacts 42 in FIGUURE 6 are closed to activate the inspection circuit, which may be accomplished in any suitable manner such as by the photosensitive circuit in Hughes 2,635,747 which activates the scanning or measuring circuit when a container is properly within the inspection station, or by a mechanical system tripped by the container as in Hughes et al. 2,529,081, 120 volts A.C. potential on terminals A and B is applied between anode 43 and cathode 44 of thyratron tube 40. The circuit to control grid 45 includes resistor 50, photocell 32 and capacitor 47, parallel variable resistors 48 and 49 adjusted to resistance values selectively determined by the color of the contents being measured, a color selector switch 51 for selecting one or the other of resistors 48 or 49, and capacitor 52. Lead 53 is connected through transformer winding 54 to power bus 55.

Winding 56 of the transformer has one terminal connected to the other power line 57 and its other terminal connected to one side of filament heater 58 for tube 20.

The other side of filament heater 58 is connected to power line 57. Diode 60 and resistor 61 are connected between photocell 32 and transformer winding 56 to provide the necessary bias voltage cause tube 40 to fire when the resistance of photocell 32 is high which results from inadequate illumination received from reflected light due to improper level of contents in the container.

Sensing relay 62 is provided in the anode circuit of tube 40 in parallel with neon tube 63 and resistor 64, to become energized when tube 40 conducts. When relay contacts 65 close, the potential on bus 55 is applied to a fixed commutator segment 66. As commutator bar 67 rotates counterclockwise in FIGURE 6, commutator segment 68 becomes electrically connected to segment 66 to thereby apply the potential from segment 66 to one terminal of the coil on a holding relay 69. As the other terminal of the coil on holding relay 69 is connected to the potential on bus 57, relay 69 energizes, thereby closing contacts 71 and providing a parallel circuit to that containing contacts 65 for maintaining the potential from bus 55 on commutator segment 66 after conduction through thyratron 40 is extinguished, which may result from the opening of timer contacts 42, thus maintaining energization of the inspection system.

As commutator bar 67 rotates to a position bridging segments 66 and 72, the box having an improper level of contents will be moving into a position where it can be rejected as a result of energization of reject solenoid 41. As one terminal of reject solenoid 41 is always connected to the potential on bus 57, energization of reject solenoid 41 occurs only when the potential from bus 55 is present on commutator segment 66 and commutator bar 67 bridges segments 66 and 72.

It is possible to cause manual operation of reject solenoid 41 by manually closing contacts 80 when commutator bar 67 is in contact with segment 66 to thus energize holding relay 69 and cause subsequent energization of reject solenoid 41 when commutator bar comes in contact with segment 72.

It is also possible to cause acceptance, by blocking rejection where tube 40 is rendered conductive, by means of manually opening the contacts of manual acceptance switch 81.

Thus, with the lamp unit 14 and light sensitive unit 15 set up as in FIGURES 1 and 4, and the circuit of FIGURE 6 properly adjusted, all for inspecting moving containers of a given size or substance level and a given substance color, the inspection and associated rejection device 16 will operate automatically. At this time the iris diaphragm has been set for a certain opening at 24.

Should the substance level desired remain the same but the color of the substance change, as when boxes 11 of the same size may contain white powder instead of blue, the sensitivity selection switch at 51 is actuated to connect either resistor 48 or 49 in the circuit. These have been so calibrated that the mere change from one resistor to the other will adapt the circuit of FIGURE 6 to operatively function to inspect containers filled with material of one color or another. Obviously other parallel circuit resistors could be used here to provide a selection of more than the two illustrated.

Figure 5:
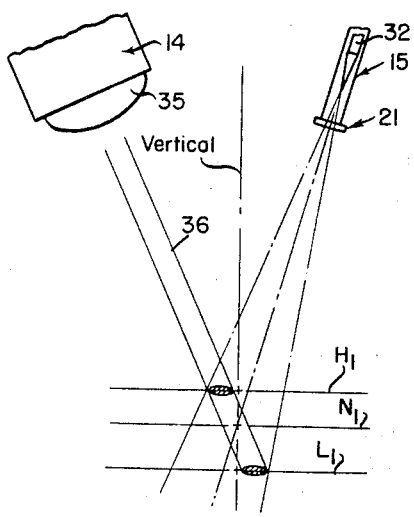

FIGURE 5 shows the condition prevailing when a container with a different permissible range of substance fill levels enters station 13. Here the high (overfill) and low (underfill) levels are indicated at $H_1$ and $L_1$ respectively. It is a feature of the present invention that, instead of making mechanical cut and try adjustments of height and other location for the lamp and photocell units, the system may be adapted to these different limits of deviation merely by the selective adjustment of aperture 24.

Thus the acceptable deviation range from an optimum level may be varied merely by adjusting the size of aperture 24, and scale 28 may be calibrated in terms of these ranges. When different sized containers are to be checked the light unit 14 or photocell unit 15, or both, are adjusted for the optimum level and the aperture 24 is set to define the deviation range from that optimum level.

This adjustment is made by rotation of shaft 26. In actual practice the particular adjustment necessary to change the system from one size container inspection to another can be determined once and for all time beforehand by noting the reading on dial 28, and when a changeover is made the machine operator merely resets the iris to the proper dial setting and knows that the system is now in order.

In the invention the amount of light in beam 36 is normally constant and the possible variations in substance levels are such as to be substantially immaterial as far as the angular relationships of the lamp and photocell units are concerned. However, the illumination of any surface generally varies inversely as the square of the distance of the surface from the source, as does the power of light reflected from that surface to a receptor vary with the corresponding distance. Therefore, when changes in substance level limits are encountered, the intensity of illumination at the surface of the product in the container and the illumination of the photocell by light reflected from that surface are both changed correspondingly. The intensity of illumination is decreased when the product level is lower, increased when higher. In order to adapt the system to operate for changed level limits the aperture 24 is varied. Thus, a change of scope of surface of product "seen" by the photoelectric cell is obtained, leading to wider limits when the iris is opened, narrower limits when closed. As may be seen from FIGURES 4 and 5, the photoelectric cell is activated by the reflected light, even when less than the whole area of illusination of the detergent surface is "seen" by the cell, due to the greater intensity of the shorter beams. At the lower limit more of the illuminated spot should be "seen" to operate the cell because of the longer light path involved. From the above discussion it is seen that this level checking apparatus compensates for different light intensities obtained when product level limits are changed. It does not require altering the intensity of light emitted by source 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. An apparatus for checking the level of a substance in a filled container to determine whether said level falls within an acceptable range of deviation from an optimum fill level, means for propjecting a substantially parallel light beam onto the top surface of said substance so that regardless of the level of the substance in the container within said limits light will be reflected from substantially the same area of substance toward a detector unit, a detector unit mounted to receive light reflected from said surface area and containing a photosensitive element, adjustable means coaxial with said unit located a predetermined distance axially from said element and disposed between the substance in the container and said element selectively changing and setting the size of the effective aperture in the path of said reflected light for determining the field of view of said element and thereby varying said deviation range, so that merely by setting said effective aperture the apparatus may be selectively and precisely adapted for checking containers for different acceptable deviations from an optimum fill level without changing said distance or relatively adjusting the position of said light projecting means and said detector unit with respect to the position of the filled container.

2. In the apparatus defined in claim 1, said light projecting means and said detector unit having their axes oppositely inclined at acute angles with respect to the vertical and intersecting substantially at said optimum fill level.

3. In the apparatus defined in claim 1, a control circuit associated with said detector unit, said circuit including said photosensitive element and selectively variable components for correlating the circuit to the light reflection factors of differently colored substances in the container being checked.

4. In the apparatus for checking the level of a substance in a filled container to determine whether said level falls within an acceptable range of deviation from an optimum fill level, means for projecting a substantially parallel light beam onto the top surface of said substance so that regardless of the level of the substance in the container within said limits light will be reflected from substantially the same area of substance toward a detector unit, a detector unit mounted to receive light reflected from said surface area and containing a photosensitive element, an adjustable iris type diaphragm coaxially located a predetermined distance from said element and disposed between the substance in the container and said element for selectively infinitely varying and setting the size of the effective aperture in the path of said reflected light for determining the field of view of said element and thereby varying said deviation range, so that merely by setting said effective aperture the apparatus may be selectively and precisely adapted for checking containers for different acceptable deviations from an optimum fill level without varying said distance or relatively adjusting the position of said light projecting means and said detector unit with respect to the position of the filled container.

5. In the apparatus defined in claim 4 manual means for adjusting said iris diaphragm calibrated in accord with different ranges of deviation limits.

6. In the apparatus defined in claim 4, said iris diaphragm being mounted on said unit, and means on said unit for relatively axially adjusting said diaphragm and said element for presetting said predetermined distance.

References Cited
UNITED STATES PATENTS

| | | | |
|---|---|---|---|
| 2,142,920 | 1/1939 | Rose | 209—82 |
| 2,379,496 | 7/1945 | Saunier. | |
| 2,529,081 | 11/1950 | Hughes et al. | 209—82 |
| 2,621,808 | 12/1952 | Blakeney | 250—218 X |
| 2,635,747 | 4/1953 | Hughes | 209—82 |

RALPH G. NILSON, *Primary Examiner.*

WALTER STOLWEIN, *Examiner.*

M. A. LEAVITT, *Assistant Examiner.*